UNITED STATES PATENT OFFICE.

CARL SCHWABE, OF BERLIN, GERMANY.

PROCESS OF DEPOSITING METALS ON SILVER COATINGS.

SPECIFICATION forming part of Letters Patent No. 581,775, dated May 4, 1897.

Application filed June 5, 1896. Serial No. 594,441. (No specimens.)

*To all whom it may concern:*

Be it known that I, CARL SCHWABE, a subject of the German Emperor, residing at Berlin, Germany, have invented certain new and useful Improvements in Processes of Depositing Metals on Silver Coatings; and I do hereby declare the following to be a full, clear, and exact description of the invention.

This invention relates to an improved process for depositing metals on silver coatings.

In depositing copper on silver coatings which have been obtained on glass or other transparent bodies by reducing a silver solution the disadvantage is experienced in using the ordinary copper baths that the silver, together with the copper deposited on it, becomes separated in the form of flakes or scales from the supporting-body of glass or other material. The same thing occurs whether acid copper baths or baths of the double cyanid of potassium and copper be used for producing the deposit of copper. In order to overcome this disadvantage, careful researches and experiments have been made with such silver coatings. From these experiments it has been ascertained that remains of the silvering solution are found in the pores of the silver coating and even between the silver and the glass itself and that by chemical or mechanical reactions of such remains the silver coating or skin is torn. So it has been observed that by chemically decomposing such remains of the silvering solution by means of reagents decomposing such silvering liquids (such reagents are acids or acid salts or cyanid of potassium) chemical reactions are produced within the pores of the silver coating or between the silver coating and the glass and that these reactions produce motions, vibrations, irritations, or the like, influencing the silver coating or acting injuriously on the same, and consequently the silver coating or skin is torn. These experiments have also shown, as above indicated, that mechanical reactions act likewise injuriously on the silver coating. Such mechanical reactions may consist in dissolving or swelling the said dried remains by the liquid-copper bath.

The above considerations explain why a silver coating which was immersed in the usual acid bath for the deposition of copper thereon, was torn and partially or wholly separated together with the copper deposited on it, from the glass or other support. A similar result was obtained by using baths of the double cyanid of potassium and copper.

In the chemical reaction which takes place between the remains of the original silvering liquid existing in the silver coating and between the silver coating and its support and the constituents of the metal bath the liquid particles are set in motion, and these movements, together with changes of condition, evolution of heat, &c., cause the silver skin to become torn.

The above statements are supported by the observation that a drop of dilute sulfuric acid placed on a silver coating produced by the reduction of an ammoniacal silver solution tears the said silver coating around the drop of sulfuric acid, the silver coating being considerably contracted. Not only do baths for depositing copper act in this way, but the same results are obtained with baths for depositing other metals.

According to my invention I effect the deposition of other metals on silver coatings as follows—that is to say, I prevent the mutual reaction between the constituents of the bath and the substances inclosed in the interior of the silver during the preceding process of obtaining the silver coating. Experiment has further shown that such a process for depositing metal on silver coatings can be carried out advantageously by adding to the metallic bath the remains of the silvering solution (such as a suitable quantity of the bath employed for silvering the glass) or the essential constituents of the same, or substances which produce an analogous result—that is to say, which cause the reactions or decompositions that would otherwise be set up in the silver coating by the metal bath to previously take place in the said metal bath itself.

The essential constituents of the fresh silvering-bath are: (*a*) a silver salt—*e. g.*, nitrate of silver; (*b*) a reducing or deoxidizing agent—*e. g.*, sugar or other suitable organic substance; (*c*) a basic substance adapted to combine with or to bind the acid constituent of the silver salt—*e. g.*, caustic soda-lye or ammonia.

The process of silvering the glass by means of such silvering solutions is a chemical one, the silver being reduced from the silver salt by the simultaneous action of the basic substance and the reducing agent and deposited as a metallic skin upon the glass.

The above-mentioned essential constituents of the so-employed silvering solution are, on the one hand, the residues of the said essential constituents of the fresh silvering solution remaining in the same after the silvering process has been performed, and, on the other hand, the products formed by the decompositions taking place within the silvering solution, consequently to the reducing action during the silvering process. Such products are, e. g., salts formed by the combination of the basic substance with the acid constituent of the silver salt. If, therefore, nitrate of silver (silver salt) and caustic soda (basic substance) have been employed for the silvering-bath, such product formed by the use of such bath for silvering glass is nitrate of sodium. If, for instance, as silvering solution a mixture has been used the essential constituents of which are nitrate of silver, ammonia, (changing into nitrate of ammonia,) and sugar solution, it is added to the galvanizing (e. g., coppering) bath (which may consist of a solution of sulphate of copper) either a quantity of the employed silvering-bath or an essential constituent of the same. Consequently in this case nitrate of ammonia may be added. In both cases the desired effect is reached. If, instead of ammonia, for instance, soda has been employed for the silvering-bath, an essential constituent of the silvering-bath will be nitrate of sodium, and in this case nitrate of sodium is to be added to the coppering-bath.

On the base of the experiments the invention is not restricted to the addition of a quantity of the silvering-bath or of the real constituent of the same, but instead of the said substances analogous substances may be added which act in an analogous manner, compared with the said constituents of the fresh or employed silvering-bath—e. g., if the glass has been silvered by means of a bath containing nitrate of silver, nitrate of ammonia, and sugar solution, nitrate of sodium (or of potassium) may be added instead of nitrate of ammonia to the metal or galvanizing bath. Furthermore, for obviating the injurious action of dried remains of sugar within the silver coating which remains derived from the bath used for the silvering operation it is not absolutely necessary to add sugar to the galvanizing (e. g., coppering) bath. The same effect—i. e., the preventing of dissolving these dried remains of sugar—can also be attained by the addition of alcohol, which in this case acts analogously to sugar—i. e., prevents the dissolving of the dried sugar remains of the silver coating in the metal or galvanizing liquor.

As metal or galvanizing liquor or bath any solution of a metal adapted to be electrolytically deposited from this solution upon the silver coating may be used. Very often a coppering-bath may be employed, because the deposition of copper upon the silver skin is very often desired. The essential constituents of such galvanizing or metal bath (e. g., coppering-bath) may consist of a metallic salt, (copper salt,) preferably dissolved in water, and of the said remains of the silvering-bath or of the said essential constituents thereof. Such solution is employed as electrolyte for galvanoplating in the ordinary way the silver skin chemically deposited upon glass articles. The galvanizing or coppering process is therefore an electrolytical or galvanoplating process.

In the following an explanation of the theory of the action of my invention is stated, but it must be understood that the patentability of the process cannot be limited to this theory should it be possible to substitute for this scientific meaning of the process another meaning.

The explanation is the following:

First. The loosening of the silver coating by dissolving the remains of the silvering solution is prevented or sufficiently retarded by adding such silvering remains to the galvanic bath, whereby the solubleness of the remains dried in the silver coating is annulled or sufficiently reduced, because a substance soluble in a liquid becomes insoluble therein as soon as the liquid is saturated by the same substance.

Example: If ammonium nitrate is found in the pores of the silver coating, this ammonium nitrate is less soluble in a solution of sulfate of copper (blue vitriol or vitriol of copper) to which ammonium nitrate is added than in a solution of blue vitriol alone.

Second. The chemical reactions of the remains of the silvering solution inclosed in the silver coating are prevented or sufficiently retarded according to the law of the action of masses. It is known that by mixing the solutions of two compositions—for instance, called A M and B N—a changing decomposition is produced by which a compound of four compositions—(A+M), (A+B), (B+N), and (M+N)—is obtained. Furthermore, it is known that the quickness of these reactions is variable and that the reactions are less rapid the nearer the mixture is to the final equilibrium of the four compositions (A+M), (A+B), (B+N), and (M+N.) If the equilibrium is attained and if then a little quantity of one of these compositions—for instance, of (A+M)—is added to the whole compound, the equilibrium is disturbed the less the more of this substance (A+M) already was contained in the compound.

Example: If solutions of $NH_4NO_3$ and $CuSO_4$ are mixed, an equilibrium of the four compositions $NH_4NO_3$, $Cu(NO_3)_2$, $NH_4SO_4$, and $CuSO_4$ must be obtained. Now an object with a silver coating containing in its pores a small quantity of $NH_4NO_3$ may be dipped in this mixture. Consequently the $NH_4NO_3$ of the silver coating acts in a less degree upon the mixture of the four substances than it would be acting in a clean solution of $CuSO_4$.

Except the ammonium nitrate also other ammonium salts are found between the particles of the silver coating—viz., the ammonium salts of those organic acids which can be obtained by oxidizing the organic substances which are reducing the silver. Also these organic salts cause a loosening of the silver covering by its dissolving or by its chemical reaction. By adding such a salt to the metallic bath the reaction or solution also can be prevented or retarded, as shown in view of the $NH_4NO_3$.

By this method of carrying out the above-described process it is only necessary to add to the metal bath, which may be, for instance, a copper or a gold solution or a solution containing any other metal to be deposited on the silver coating, sufficient of the silvering fluid or of its active elements or of an analogously-acting substance to prevent any reaction taking place between the metal bath and the substances present in the silver coating. The proper quantities can be ascertained by a preliminary experiment. The bath is then ready for depositing its metal on the silver coating.

Having now particularly described and ascertained the nature of the said invention and in what manner the same is to be performed, I declare that what I claim is—

1. The improved process for silver-coating, which process consists in applying a silver coating to an object by the chemical reduction of a silver solution on the surface thereof, and in subsequently applying a metallic deposit to such coating by treating it electrolytically in a solution of a compound of the metal to be electrolytically deposited on such coating, and containing such amounts of the salts employed in the first solution as to impede re-solution in such electrolyte of any such salts which may have become entangled in the preliminary coating during said chemical reduction, whereby during the electrolytic deposition chemical reactions between the electrolytic solution and the remnants in the primary coating of the chemical employed for obtaining the latter, are partially prevented, substantially as described.

2. The improved process of coating objects, which process consists in applying a primary metallic coating to an object by the chemical reduction of a silver solution thereon, and subsequently electrolytically covering such primary coating with a second coating by treating it with an electrolyte consisting of a solution containing a salt of the metal to be applied, and containing substances partially neutralizing it as to chemical reaction with any remnants of the salts employed in the first solution which may have become entangled in the preliminary coating during the previous chemical reduction, whereby during the deposition of the second coating the electrolyte is partially prevented by such substances from setting up chemical reactions with any remnants of the solution employed for the first coating which may remain in the coating, substantially as described.

In testimony that I claim the foregoing as my invention I have signed my name in presence of two subscribing witnesses.

CARL SCHWABE.

Witnesses:
WM. HAUPT,
ED. WUERTEMBERG.